United States Patent [19]
Kitano et al.

[11] Patent Number: 4,854,678
[45] Date of Patent: Aug. 8, 1989

[54] ELECTRO-OPTICAL LIGHT SHUTTER DEVICE

[75] Inventors: Hirohisa Kitano, Takatsuki; Itaru Saito, Itami; Kouichi Shingaki; Ken Matsubara, both of Takatsuki; Tomohiko Masuda, Amagasaki, all of Japan

[73] Assignee: Minolta Camera Kabushiki Kaisha, Osaka, Japan

[21] Appl. No.: 108,588

[22] Filed: Oct. 14, 1987

[30] Foreign Application Priority Data

Oct. 17, 1986 [JP] Japan ................................ 61-248204
Dec. 23, 1986 [JP] Japan ................................ 61-313606

[51] Int. Cl.$^4$ ............................ G02F 1/01; G02F 1/03
[52] U.S. Cl. .................................... 350/356; 350/355
[58] Field of Search ............... 350/355, 356, 388, 392, 350/393, 384

[56] References Cited

U.S. PATENT DOCUMENTS

| | | | |
|---|---|---|---|
| 3,555,454 | 1/1971 | Myers et al. | 350/388 |
| 3,619,031 | 11/1971 | Amstel | 350/388 X |
| 3,900,248 | 8/1975 | Nagasaki | 350/388 X |
| 4,166,230 | 8/1979 | Luft | 350/356 |
| 4,222,638 | 9/1980 | Robert | 350/356 X |
| 4,289,384 | 9/1981 | Samek | 350/392 |
| 4,516,838 | 5/1985 | Bademian | 350/392 X |
| 4,707,081 | 11/1987 | Mir | 350/388 |

FOREIGN PATENT DOCUMENTS

| | | | |
|---|---|---|---|
| 52-8842 | 7/1976 | Japan . | |
| 0098629 | 8/1979 | Japan | 350/355 |
| 60-159722 | 8/1985 | Japan . | |
| 60-170828 | 9/1985 | Japan . | |
| 61-38927 | 2/1986 | Japan . | |
| 0090127 | 5/1986 | Japan | 350/356 |
| 1534027 | 11/1978 | United Kingdom . | |

Primary Examiner—Eugene R. Laroche
Assistant Examiner—Nathan W. McCutcheon
Attorney, Agent, or Firm—Price, Gess & Ubell

[57] ABSTRACT

An electro-optical light shutter device for use in electrophotographic printers or the like including an elongated plate having an electro-optical effect, a polarizer and an analyzer disposed on the light incident and emergent side of the plate, respectively. The plate is formed with a first groove extending longitudinally thereof, a second groove parallel to the first groove with a predetermined distance having a smaller depth than the first groove and a plurality of third grooves extending in a direction across the first and second grooves having a smaller depth than the first groove but a larger depth than the second groove, and provided with a plurality of projections aligned longitudinally thereof which are divided by the forming of the first, second and third grooves. A common electrode for the plurality of projections in common and individual electrodes corresponding to the respective projections individually are respectively provided in the first and second groove and connected to a drive circuit for selectively applying an electric field to the projections.

18 Claims, 19 Drawing Sheets

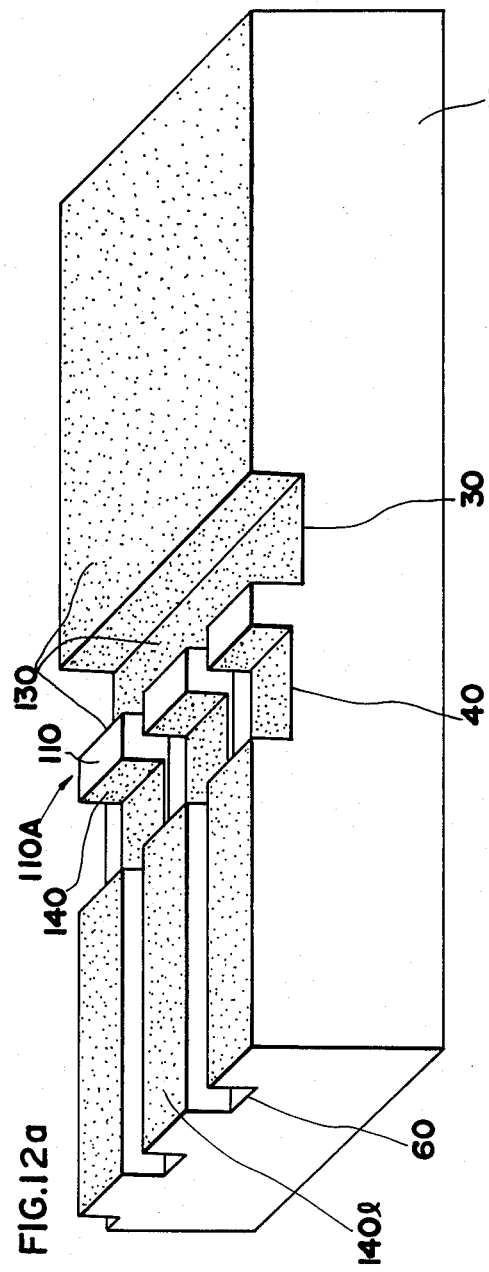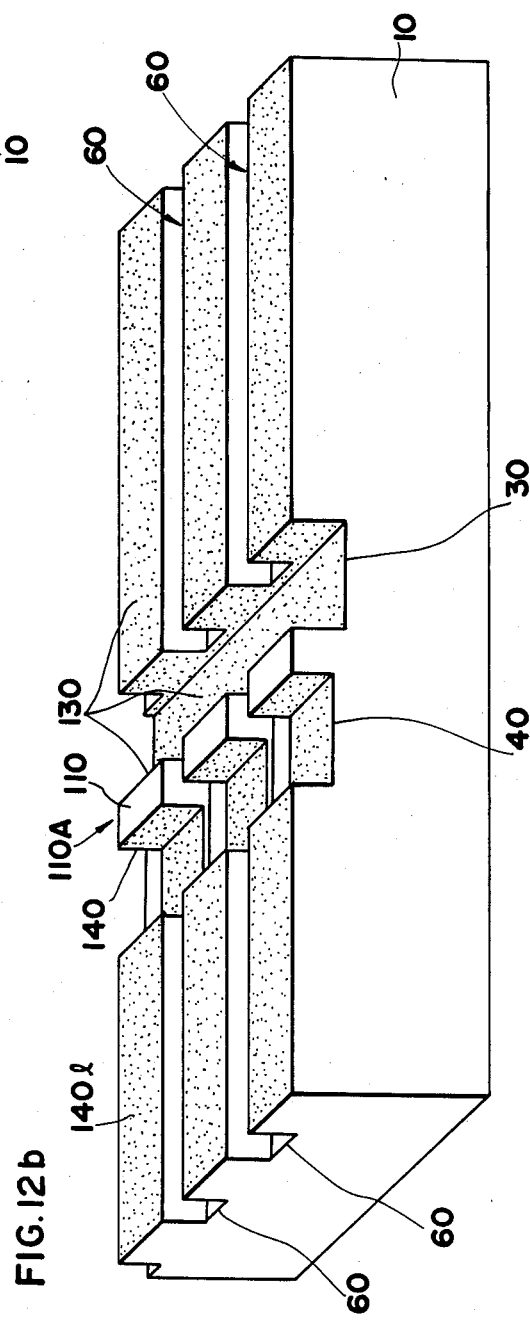
FIG.12a
FIG.12b

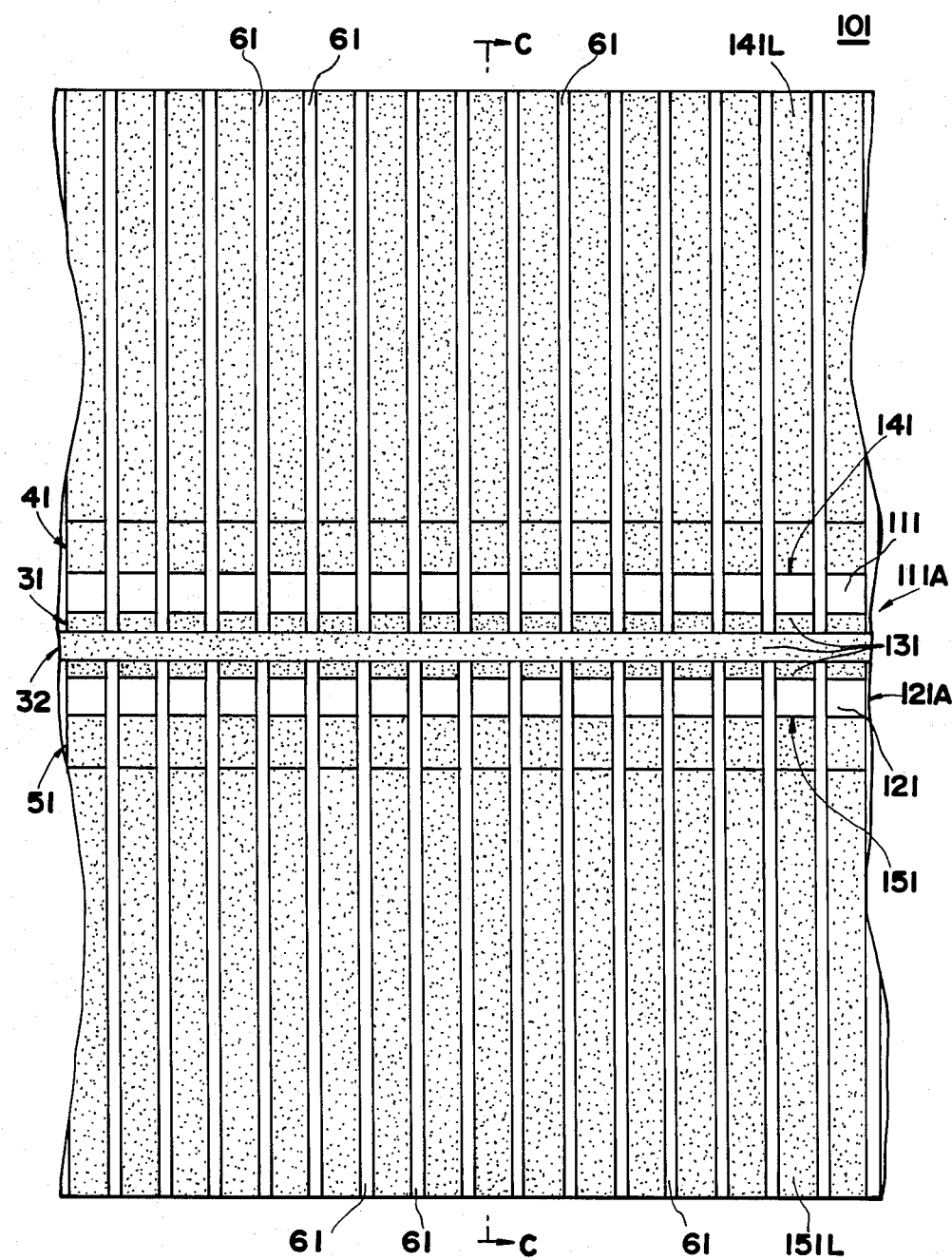

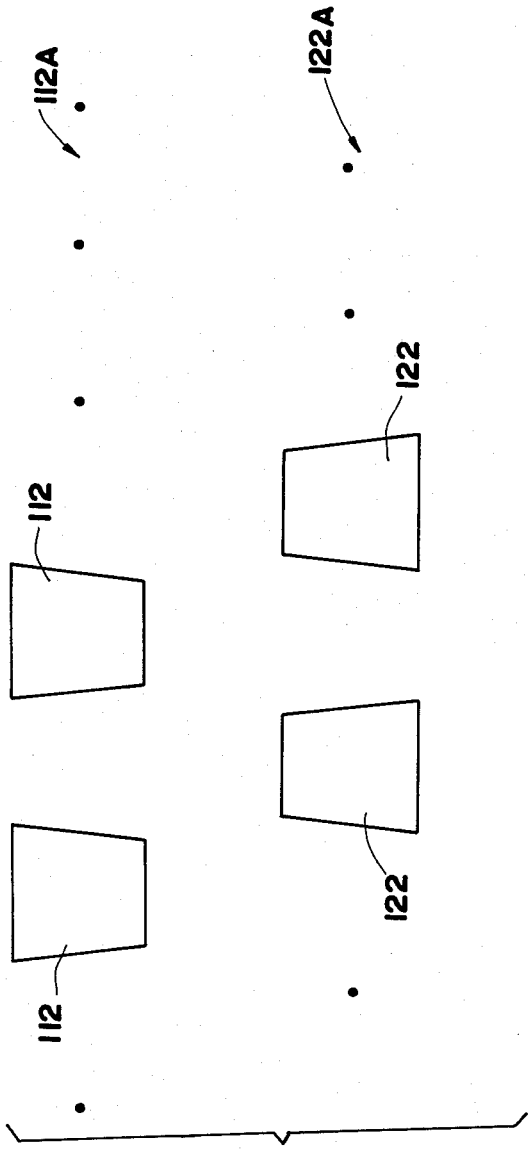
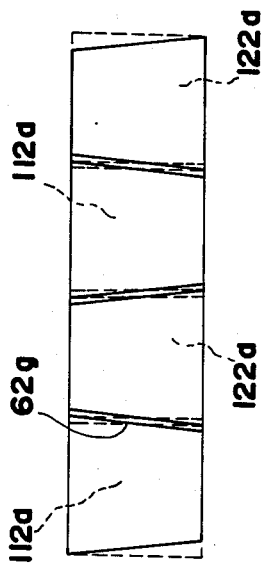
FIG.19a
FIG.19b

ELECTRO-OPTICAL LIGHT SHUTTER DEVICE

FIELD OF THE INVENTION

The present invention relates to a light shutter device utilizing a substance having an electro-optical effect, and more particularly to a light shutter device which is usable as a printing head for electrophotographic printers.

BACKGROUND OF THE INVENTION

Light shutters comprise a plurality of aligned shutter elements prepared from a substance having an electro-optical effect, especially PLZT having a great Kerr constant, and a polarizer and an analyzer which are arranged in combination therewith. Such light shutters have a high response speed and are expected to be useful for high-speed printers, especially for electrophotographic printers.

Conventionally, light shutters of this type have been fabricated by forming an electrode pattern on the surface of PLZT wafer. However, they have the drawbacks of the presence of a stray capacity and high drive voltage, so that structures have recently been proposed wherein the shutter elements are formed three-dimensionally and are provided with electrodes on the opposed surfaces thereof as disclosed, for example, in Unexamined Japanese Patent Publication SHO Nos. 60-159722 and SHO 60-170828.

The former publication discloses a light shutter which is prepared by forming a pattern of connection electrodes on a glass substrate, adhering a bar of PLZT formed with electrodes opposed to each other and cutting the bar at a predetermined spacing with a diamond cutter. The latter publication discloses a light shutter fabricated photolithographically, i.e. by forming electrode providing grooves in a flat plate of PLZT by chemical etching, then depositing an electrode metal over the entire surface of the plate by vacuum evaporation and thereafter etching the plate again photolithographically to form the desired electrode pattern.

Nevertheless, the former technique has the problem of involving an extremely complex fabrication process, while the latter technique also requires a complex fabrication process and has the problem that it is difficult to provide shutter elements which are operable at a reduced voltage since the grooves to be formed by chemical etching can not be made deeper (about 2 $\mu$m in the disclosed embodiment).

SUMMARY OF THE INVENTION

Accordingly, the main object of the present invention is to provide a light shutter device which is easy to fabricate and which is operable at a low drive voltage.

Another object of the invention is to provide a light shutter device having a suitable shutter effect.

Another object of the invention is to provide a light shutter device comprising PLZT shutter elements to which an electric field is uniformly applicable, the device further being operable free of chromatic aberration or the like.

Another object of the invention is to provide a light shutter device which is usable for electrophotographic printers and which produces outstanding images.

The above objects can be fulfilled by a light shutter device for use in electrophotographic printers or the like, the device comprising:

an elongated plate having an electro-optical effect,
a polarizer disposed on the light incident side of the plate, and
an analyzer disposed on the light emergent side of the plate,
the plate being formed with a first groove extending longitudinally thereof, a second groove similarly extending longitudinally of the plate and positioned at a predetermined distance from the first groove, the second groove having a smaller depth than the first groove, and a plurality of third grooves extending in a direction across the first and second grooves and having a smaller depth than the first groove but a larger depth than the second groove, the plate being provided with a plurality of light shutter elements comprising rectangular parallelepipedal portions surrounded by the first, second and third grooves, a common electrode provided in the first groove for the plurality of light shutter elements in common and individual electrodes provided in the second groove for the respective light shutter elements individually.

BRIEF DESCRIPTION OF THE DRAWINGS

These and other objects or features of the present invention will become apparent from the following description of preferred embodiments thereof taken in conjunction with the accompanying drawings, in which:

FIGS. 12(a) and (b) are fragmentary perspective views showing different modifications of the light shutter unit 100 of FIG. 2 wherein one shutter array is provided;

FIGS. 13 and 16 are a fragmentary perspective view and a fragmentary plan view showing a light shutter unit 101 included in a light shutter device as a second embodiment of the invention;

FIGS. 19(a) and (b) are diagrams illustrating the shutter operation of the light shutter unit 102 of FIG. 18.

In the following description, like parts are designated by like reference numbers throughout the several drawings.

DESCRIPTION OF THE PREFERRED EMBODIMENTS

The present invention will be described below in detail with reference to the embodiments shown in the accompanying drawings.

Figure 1:
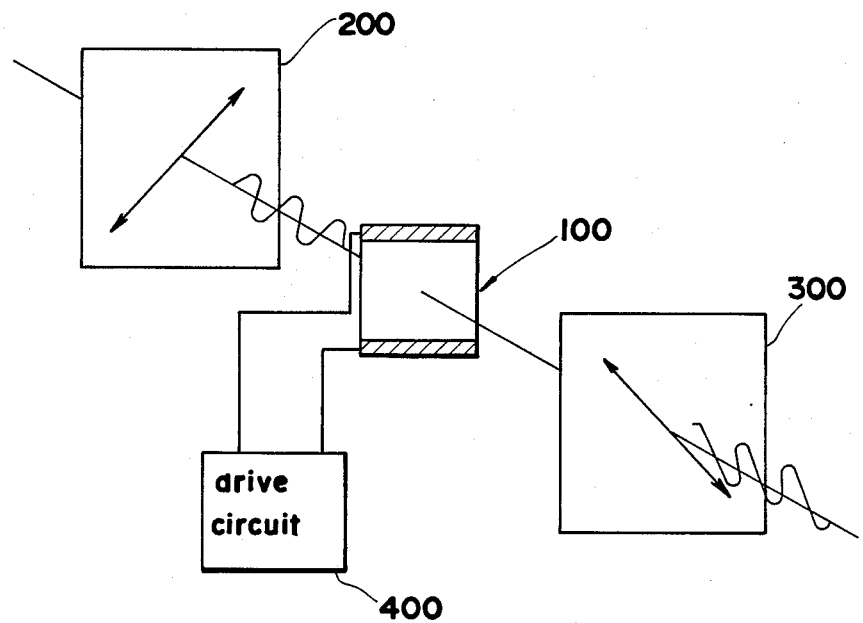
FIG. 1 is a diagram showing a first embodiment of the invention, i.e., a light shutter device.

FIG. 1 is a diagram showing a light shutter device embodying the invention. A PLZT light shutter unit 100 is interposed between a polarizer 200 and an analyzer 300 intersecting each other at right angles with respect to the direction of polarization and is connected to a drive circuit 400. The light shutter unit 100 is so adapted that when a voltage is impressed thereon, the resulting electric field changes the refractive index in a specified direction. Accordingly, the light passing through the polarizer 200 does not pass through the analyzer 300 when no voltage is applied to the shutter unit 100 but passes through the analyzer 300 owing to double refraction when voltage is applied. In this way, the light is turned on and off.

Figure 2:
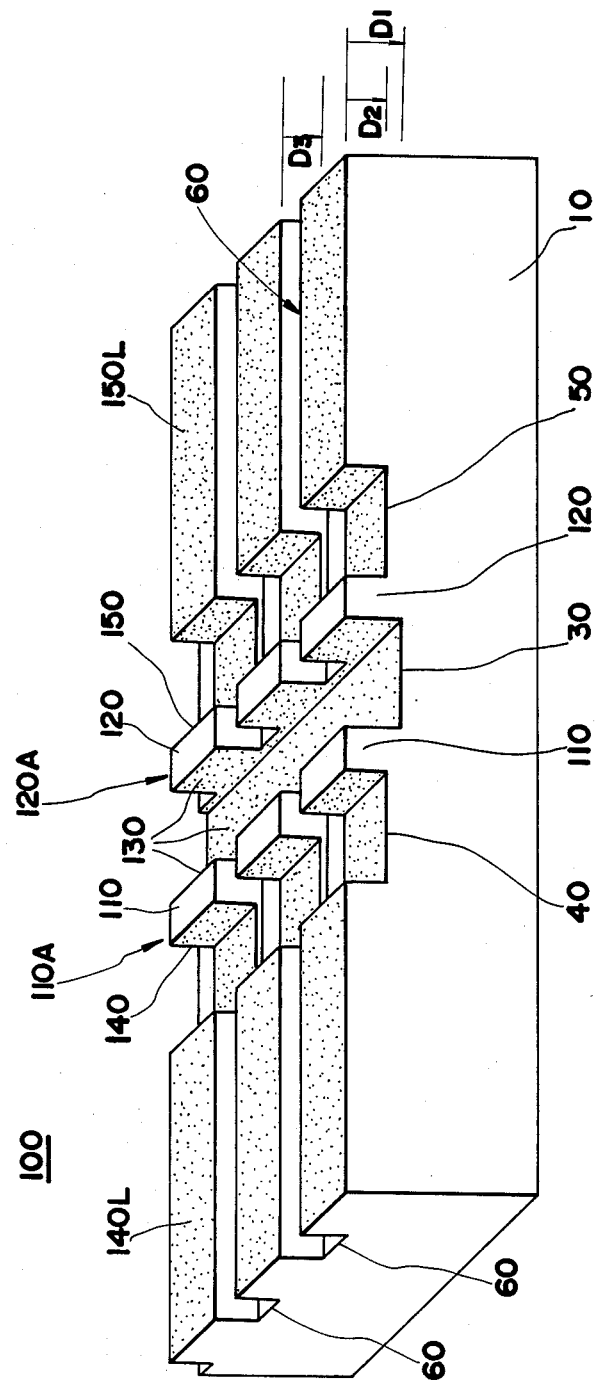
FIGS. 2 and 6 are a fragmentary perspective view and a fragmentary plan view, respectively, showing a PLZT light shutter unit 100 included in the light shutter device shown in FIG. 1.

FIG. 2 shows the main portion of the shutter unit 100 according to a first embodiment of the invention. The light shutter unit 100 is centrally provided with an array 110A of light shutter elements 110, and an array 120A of shutter elements 120 which are identical with the light shutter elements 110 in shape. Thus, the unit 100 has two arrays of shutter elements. A common electrode 130 is provided between the element arrays 110A and 120A. The light shutter element 110 has a control electrode 140 which has a lead portion 140L for connection to an external drive circuit. A control electrode 150 for the shutter element 120 is also provided with a lead portion 150L for connection to an external drive circuit.

The common electrode 130 is provided in a groove 30, and the control electrodes 140, 150 in grooves 40, 50, respectively. A multiplicity of grooves 60 extend through both the arrays 110A, 120A to separate the shutter elements. These grooves 30, 40, 50 and 60 are all formed by cutting. The process for forming the light shutter unit 100 will be described with reference to FIGS. 2 to 6.

Figure 3A:
FIGS. 3(a) and (b), 4 and 5 are diagrams showing a process for preparing the light shutter unit 100 of FIG. 2.

As seen in FIG. 3(a), an elongated flat PLZT plate 10 is prepared. The plate 10 has optically polished front and rear surfaces. For example, the PLZT plate 10 has the composition of 9/65/35 and is 100 mm in length, 5 mm in width and 0.5 mm in thickness.

Figure 3B:
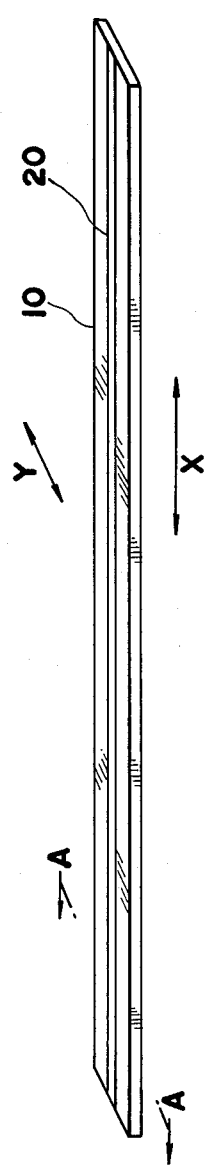
Figure 4:
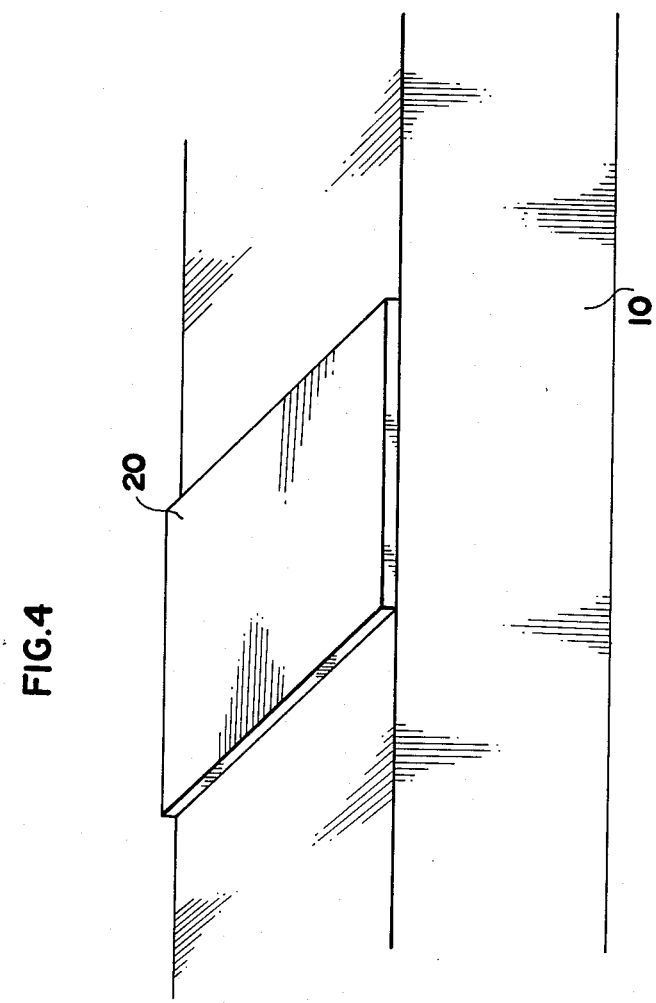

As shown in FIG. 3(b), a strip of resist pattern 20 extending longitudinally of the plate 10 is formed on the front surface of the plate 10 approximately centrally thereof. The resist pattern 20 has a width of 300 $\mu$m and is formed by the usual photolithographic technique generally. As will be described later, the resist pattern 20 is used for removing electrode metal deposit. The longitudinal direction of the PLZT plate 10 will be referred to as X-axis direction, and the widthwise direction thereof as Y-axis direction. FIG. 4 is a perspective view taken along the line A—A in FIG. 3(b) and showing the plate 10. The resist pattern 20 is about 1 $\mu$m in thickness.

Figure 5:
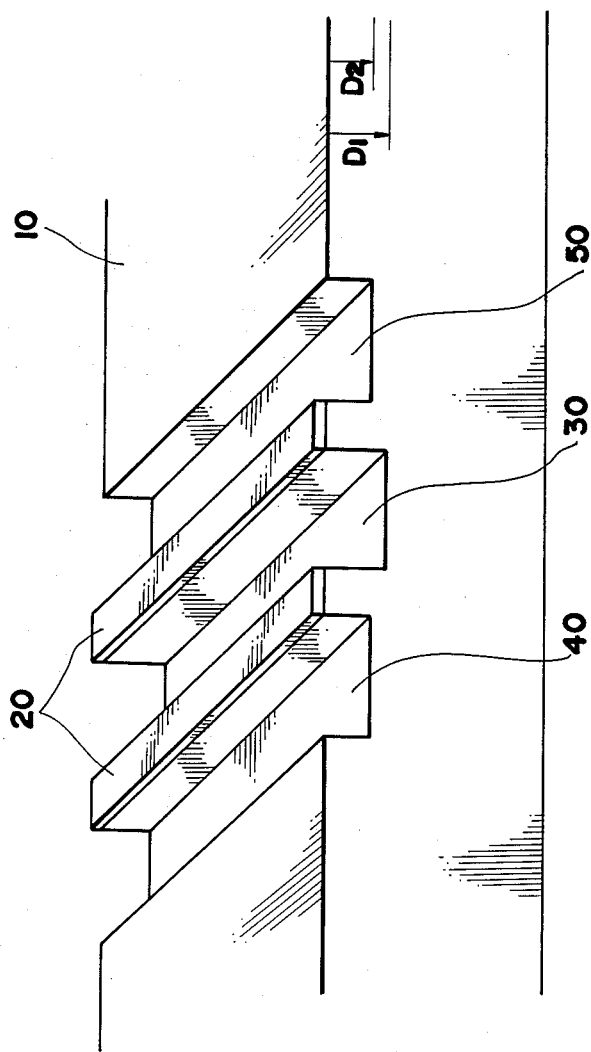

Next, the PLZT plate 10 bearing the resist pattern 20 is cut in the X-axis direction over the entire length of the plate at the center of the pattern 20 to form the common electrode groove 30 shown in FIG. 5. The plate is cut by a dicing saw with feed precision of 5 $\mu$m using a diamond cutter having a cutting edge thickness of 25 $\mu$m. The groove 30 is 80 $\mu$m in width and 150 $\mu$m in depth D1. The depth is expressed as measured from the surface of the PLZT plate 10.

In the same manner as in the above cutting step, the plate 10 is cut in the X-axis direction over the entire length of the plate in parallel to the groove 30 at a predetermined distance from each edge of the grooved portion 30 to form the groove 40 and then groove 50 for array elements (see FIG. 5). The grooves 40, 50 are identical in shape and have a width of 80 $\mu$m and a depth D2 of 110 $\mu$m. The distance between the groove 30 and the grooves 40, 50, i.e. the length of the shutter window of the shutter element is 80 $\mu$m. The length 80 $\mu$m of the shutter window and the depths D1, D2 of the grooves 30 and 40, 50 are variable as desired in accordance with the performance required of the light shutter within the tolerance of cutting, provided that $D1 > D2$.

Next, an electrically conductive metal is provided for the electrodes. In the case of the present embodiment, aluminum was deposited on the entire surface of the cut PLZT plate 10 including the cut portions by sputtering.

Figure 6:
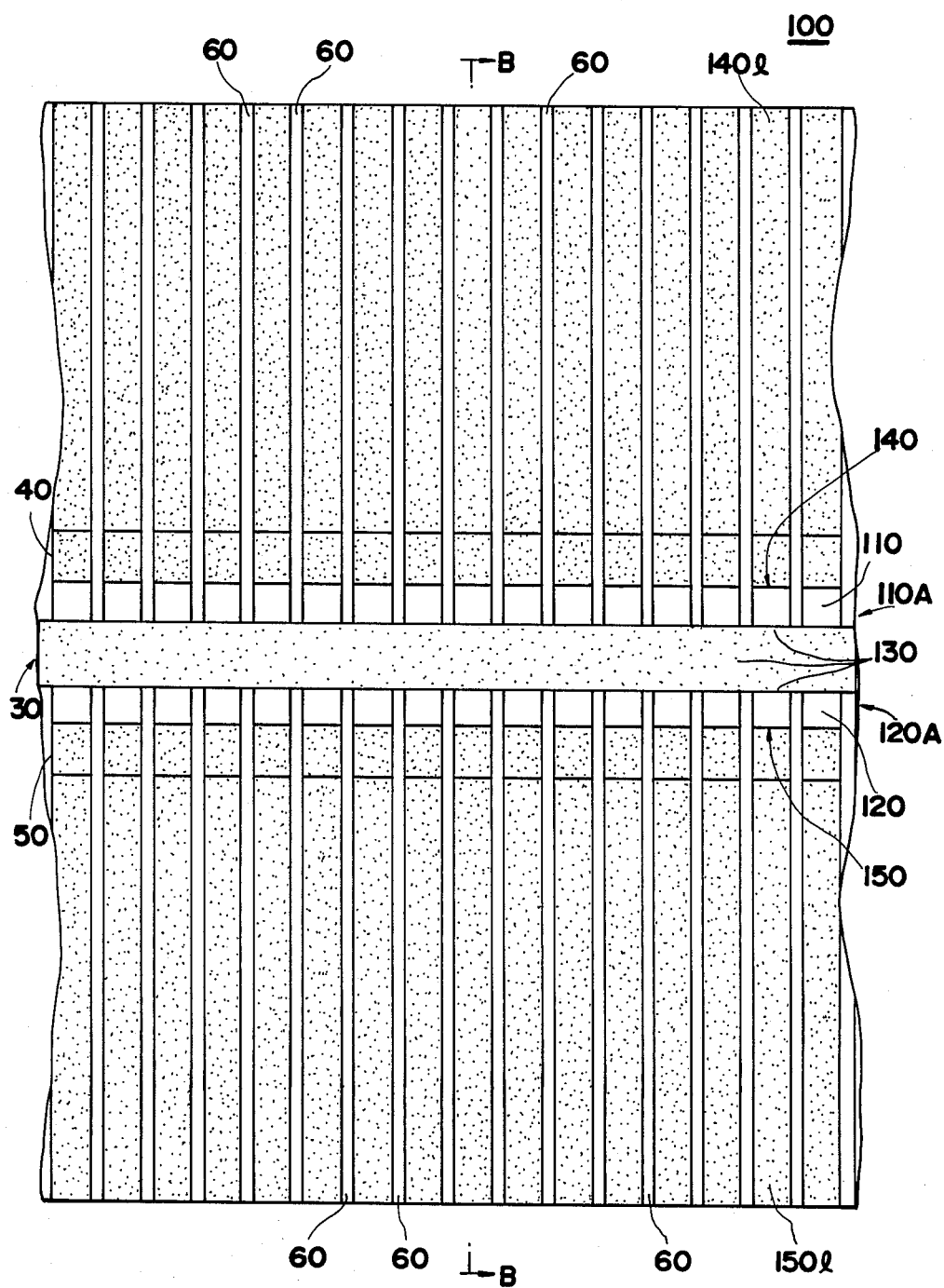

Subsequently, the PLZT plate 10 entirely covered with the aluminum deposit is cut over the entire length thereof in the Y-axis direction at a specified pitch using a dicing saw to form the multiplicity of grooves 60 for separating the elements as seen in the plan view of FIG. 6. The diamond cutter used was 15 $\mu$m in cutting edge thickness. The grooves 60 were 20 $\mu$m in width, 130 $\mu$m in depth D3 and 80 $\mu$m in pitch. The depth D3 fulfills the requirement of $D1 > D3 > D2$. When the grooves 60 have such a depth relative to the grooves 30, 40, 50, the deposited aluminum film on the grooved portions 40 and 50 is partially cut away to separate the control electrode and electrode lead portion of each shutter element from those of the others without cutting away the aluminum film at the bottom of the groove 30. The common electrode can then be formed in a planar form and, at the same time, electrodes opposed to the control electrodes can be formed in a shape generally identical therewith. Whereas the formation of electrodes conventionally requires a very complex process, the grooves of the present device can be formed by a greatly simplified process, i.e. merely by grooving.

Finally, the deposited aluminum film on the top of the shutter elements 110 and 120 is removed. Since the aluminum film is formed over the resist 20, the film is removed along with the resist 20 by a resist removing agent (lift-off method). While the deposited film is thus removable using the resist, the metal film may be directly vacuum-deposited on the PLZT plate surface and removed by a method equivalent to optical polishing.

In this way, the light shutter unit 100 shown in FIG. 2 is obtained.

Figure 7:
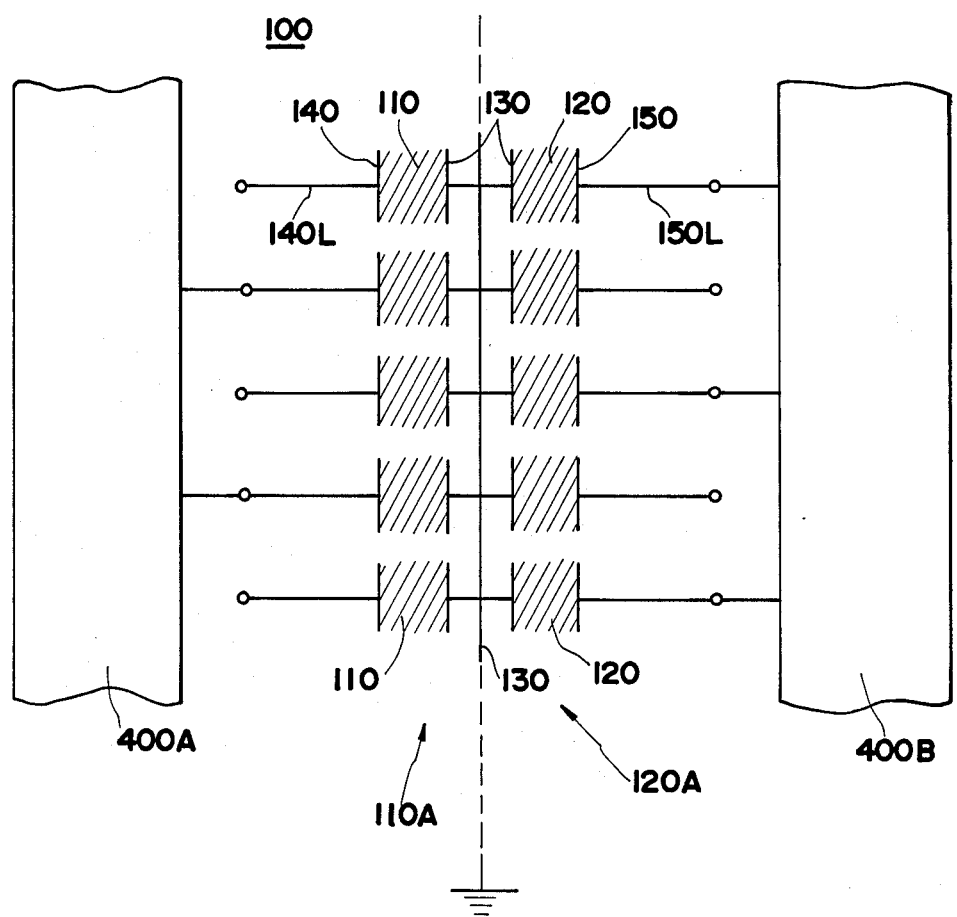
FIG. 7 is an equivalent circuit diagram showing the connection between the light shutter unit 100 of FIG. 2 and drive circuits.

FIG. 7 is a diagram showing the connection between the light shutter unit 100 and external circuits.

The drawing shows a drive circuit 400A (including a circuit in the form of a semiconductor chip) for giving drive pulses to the array 110A of shutter elements 110, and a drive circuit 400B for driving the array 120A of shutter elements 120. The drive circuit 400A is connected to the individual electrode lead portions 140L of the odd-numbered shutter elements 110 in the shutter array 110A, while the drive circuit 400B is connected to the individual electrode lead portions 150L of the even-numbered shutter elements 120 in the shutter array 120A. The shutter elements connected to neither of the drive circuits 400A, 400B are not used.

Figure 8:
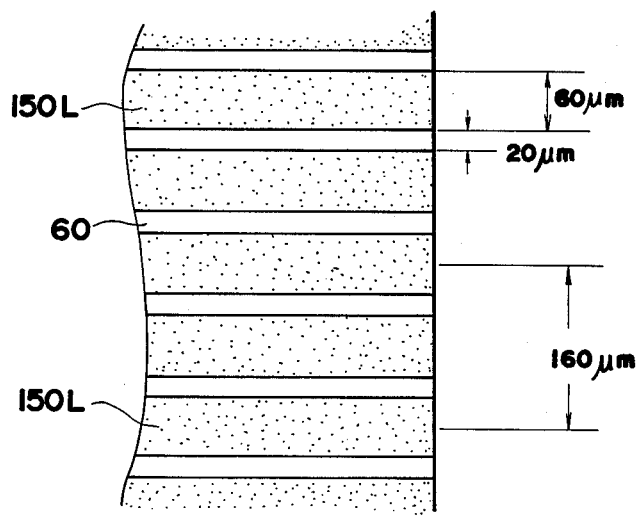
FIG. 8 is an enlarged fragmentary plan view of electrode lead portions of the light shutter unit 100 of FIG. 2.

The two shutter arrays are provided in the present embodiment to assure high resolution and, at the same time, to obviate the difficulty to be otherwise encountered in connecting the light shutter array to the drive circuit by lead wires. More specifically stated with reference to the enlarged fragmentary plan view of FIG. 8 showing some lead portions 150L joined to individual electrodes of shutter elements 120, the pitch of the lead portions 150L is 80 μm, and the width of the portions 150L is as small as 60 μm. The lead wire bonders presently available have difficulties in forming connections having an average diameter of up to 60 μm and an accurate pitch of 80 μm and yet possessing sufficient strength. Accordingly, the present embodiment is so adapted as to connect every two lead portions 150L, 140L to lead wires of 160-μm pitch using an existing wire bonder. The present arrangement is therefore readily amenable to an automatic fabrication process, ensuring great advantage in productivity.

Figure 9A:
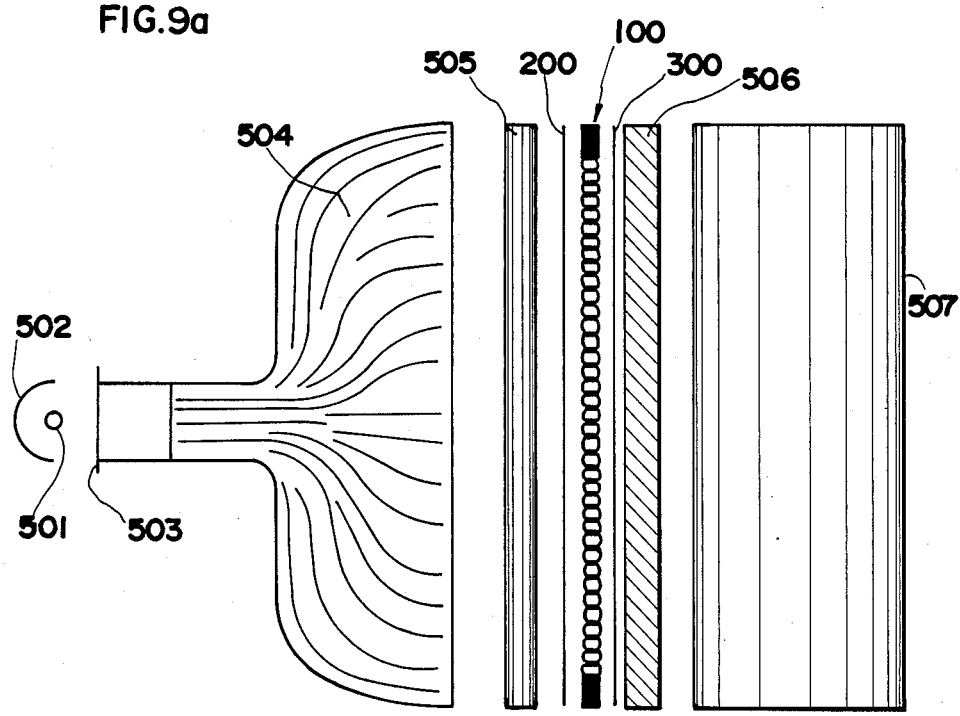
FIGS. 9(a) and (b) are diagrams showing an optical system including the light shutter device of FIG. 1 for use in an electrophotographic printer.
Figure 9B:
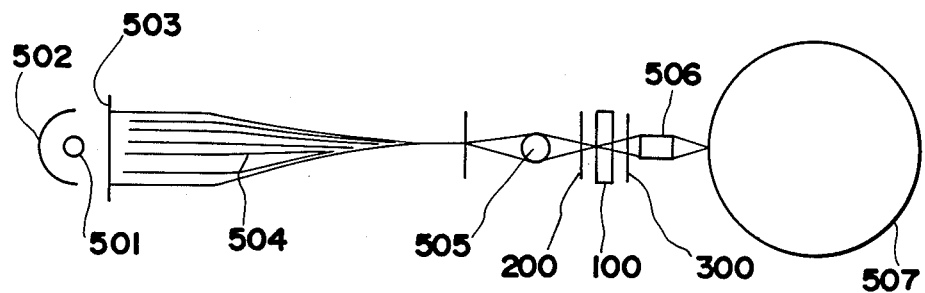

FIGS. 9(a) and (b) are diagrams showing a system including the light shutter device of the above embodiment as used for an electrophotographic printer. The light shutter unit 100 is provided between the polarizer 200 and the analyzer 300 for selectively transmitting the light from a light source lamp 501. The system comprises a reflector mirror 502 for collimating the light from the lamp 501, an infrared blocking filter 503, optical fibers 504 and a cylindrical lens 505 for concentrating the light emanating from the fibers 504 on the light shutter unit 100 in the form of a line. The linear beam from the cylindrical lens 505 is transmission-controlled by the shutter arrays of the light shutter unit 100 in accordance with an image signal. The transmitted light is projected onto a photosensitive member 507 through a condenser lens 506.

Figures 10A, 10B:
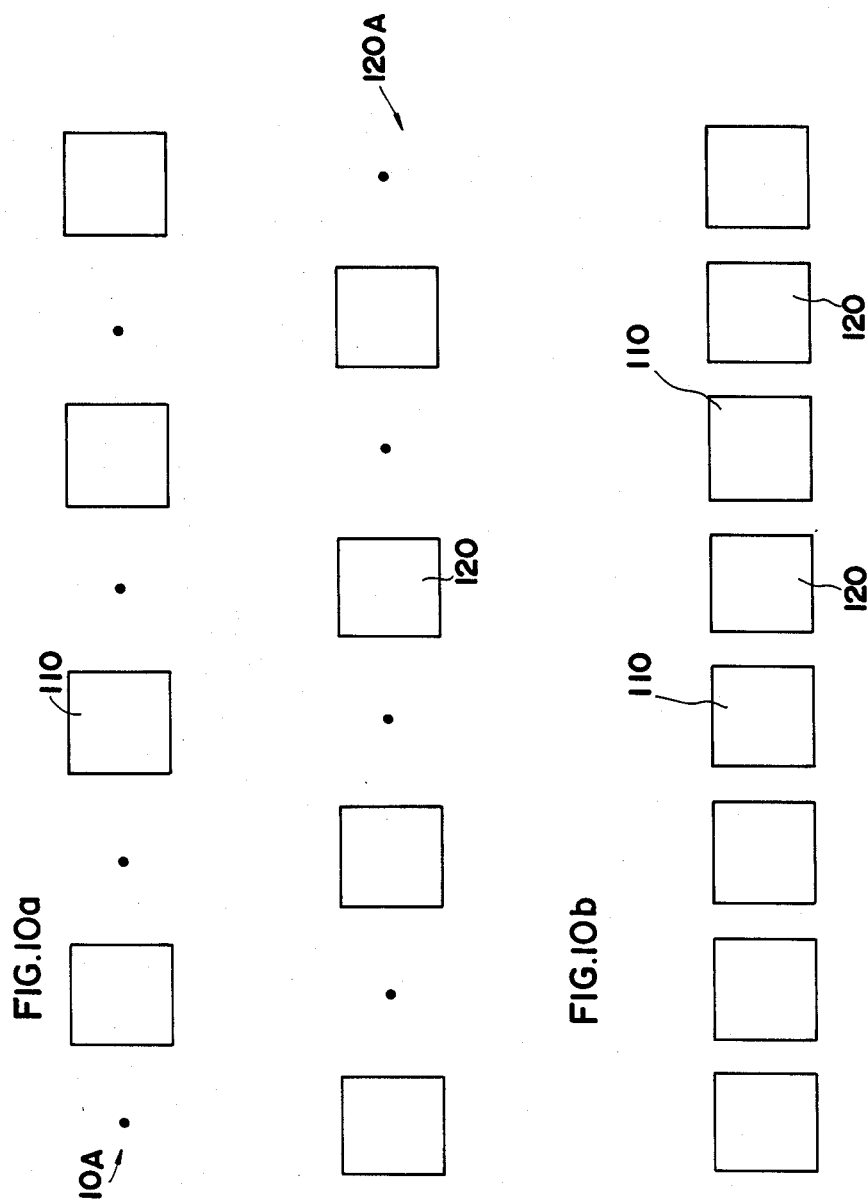
FIGS. 10(a) and (b) are diagrams illustrating the shutter operation of the light shutter unit 100 shown in FIG. 2.

The drive circuits 400A, 400B operate on a time division basis to form a single dot line of an image on the photosensitive member 507 (FIG. 10(b)) through the shutter action (FIG. 10(a)) of the two shutter arrays 110A, 110B based on image data. The time difference is adjusted in timed relation with the speed of rotation of the image forming portion, i.e. the photosensitive member 507, so that the dot lines formed by the two arrays 110A, 110B become a single line. Consequently, the light shutter unit of the present embodiment achieves high resolution of 80-μm pitch, i.e. 12 dots/mm.

Figure 11:
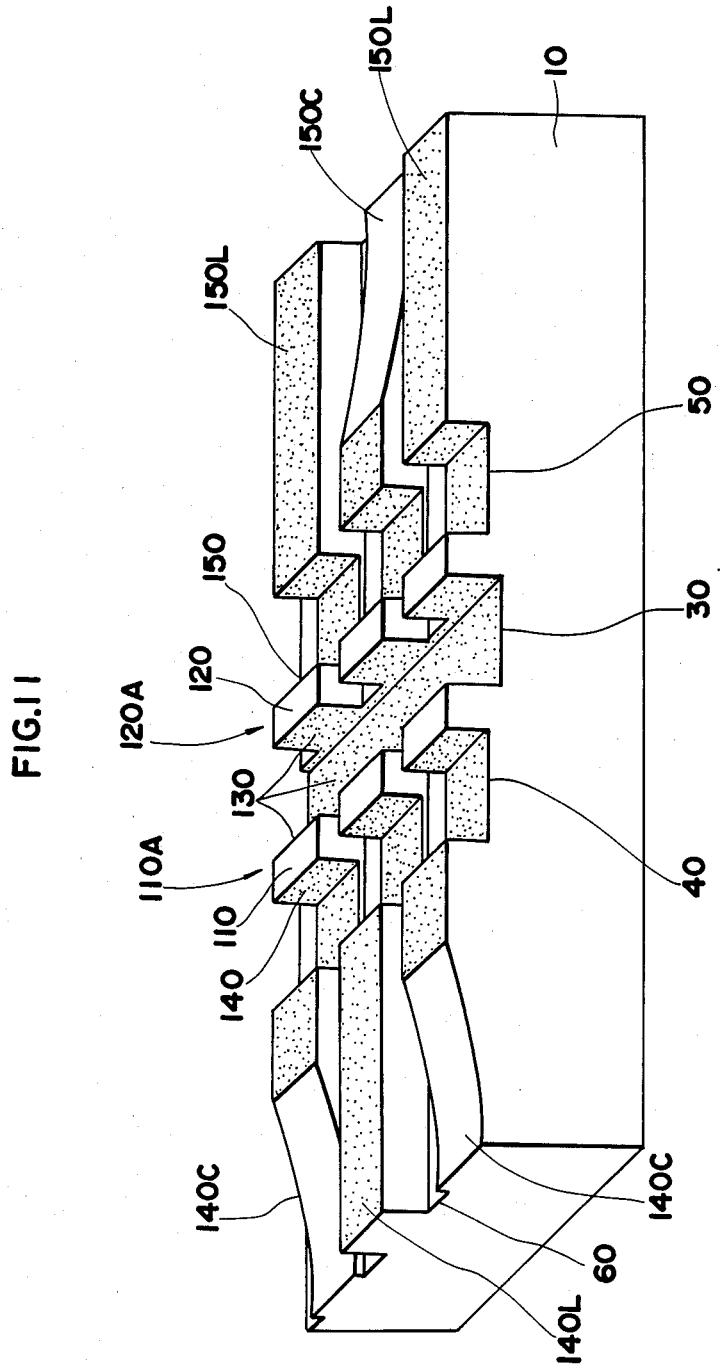
FIG. 11 is a fragmentary perspective view showing a modification of the light shutter unit 100 of FIG. 2.

FIG. 11 shows a modification of the first embodiment, i.e. an improvement over the light shutter unit 100 made from the viewpoint of assuring proper lead wire connection. The electrode lead portions 140L, 150L of the shutter elements 110, 120 which are held out of operation are cut away at their outer ends to form cut portions 140C, 150C. When lead wires are connected, as by soldering, to the ends of the electrode lead portions 140L, 150L of the shutter elements to be operated, the presence of the cut portions 140C, 150C effectively eliminates the likelihood that the connected portion (which must be at least 100 μm in average diameter to ensure strength) will become connected to the adjacent lead portion. Like the grooves, the cut portions 140C, 150C can be formed by a diamond cutter.

Although two shutter arrays are provided according to the embodiment and modification described in view of the connection to the external drive circuits, the shutter unit may basically comprise one shutter array as seen in FIG. 12(a) and (b) when there is no need to give consideration to the connection or some precision connection technique is available. Such a shutter unit of course functions in the same manner as those having two arrays.

FIG. 12(a) shows an example wherein grooves 60 extend up to the groove 30, while FIG. 12(b) shows another example wherein grooves 60 are formed across the entire width of the PLZT plate 10. The latter is advantageous in respect of the ease of machining, while the former has a common electrode 130 over an increased area for giving base bias and is therefore advantageous in respect of electric characteristics.

A description will be given of second and third embodiments of the invention, which differ from the first embodiment only in the construction of the light shutter unit, so that the different feature only will be described. The same parts as those already described are referred to each by a similar corresponding numeral and will not be described in detail.

Figure 13:
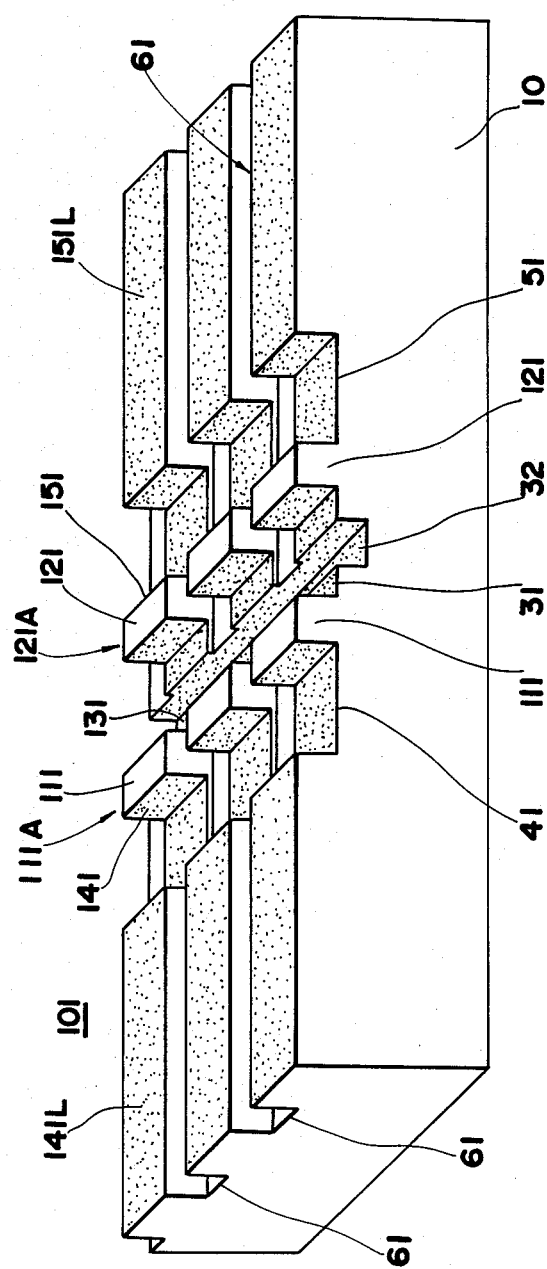

The second embodiment, which is shown in FIG. 13, is different from the first in the common electrode portion of its light shutter unit 101.

The common electrode 131 of the second embodiment is provided in a groove 31 between arrays 111A and 121A and further in a groove 32 formed in the bottom of the groove 31. The shutter elements of the arrays 111A, 121A, individual electrodes and electrode lead portions are separated from one another by parallel grooves 61 extending across the grooves 31, 32, 41, 51 at right angles therewith and arranged in parallel. The grooves 61 for the common electrode, the grooves 41 for the individual electrodes and the multiplicity of grooves 61 for separating the elements are all formed by precision cutting. With reference to FIGS. 13 to 16, the process for fabricating this light shutter unit 101 will be described.

As is the case with the first embodiment, a strip of resist pattern 20 is formed on the surface of a PLZT plate 10 approximately centrally thereof (see FIGS. 3(a) and (b) and FIG. 4).

Figure 14:
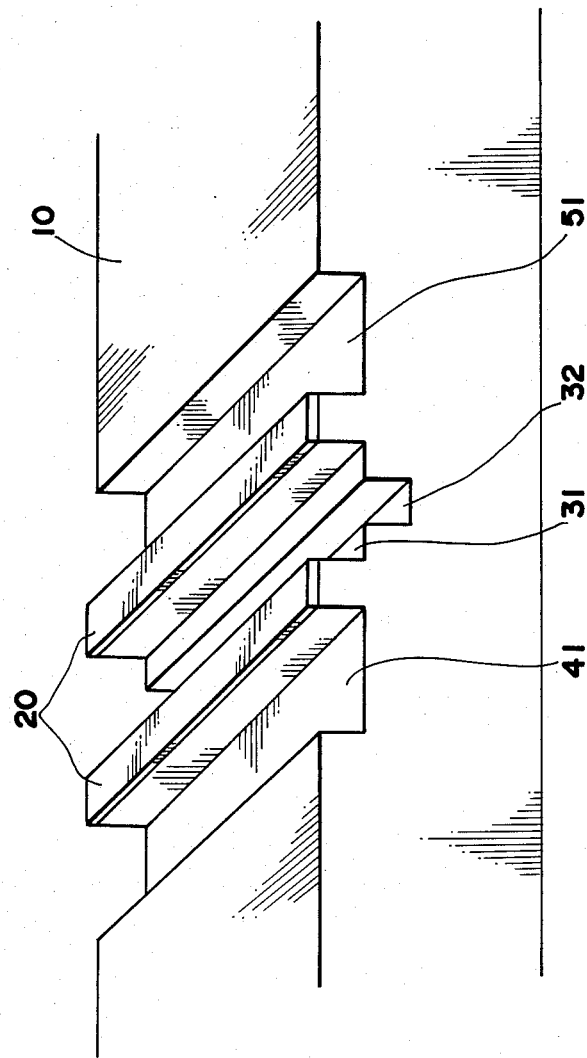
FIGS. 14 and 15 are diagrams showing a process for preparing the light shutter unit 101 of FIG. 13.

Next, the PLZT plate 10 bearing the resist pattern 20 is cut with high precision in the X-axis direction over the entire length of the plate at the center of the resist pattern 20 to form the common electrode groove 31 shown in FIG. 14. Further the groove 32 for the common electrode is formed in the bottom surface of the groove 31 in parallel thereto in the direction of thickness of the plate 10. The plate is cut with a dicing saw which is feedable accurately. The cutter used for the present unit was a diamond cutter with a cutting blade thickness of 25 μm. The groove 31 is 100 μm in width and 120 μm in depth D4 as measured from the surface of the PLZT plate 10. The groove 32 is 50 μm in width and 130 μm in depth D5 as measured from the bottom surface of the groove 31.

In the same manner as in the above grooving step, the plate 10 is then cut in parallel to the groove 31 (in the X-axis direction) over the entire length of the plate 10 at a predetermined distance from each edge of the first grooved portion 31 to form the grooves 41, 51 for the individual electrodes as shown in FIG. 10. The grooves 41, 51 are identical in shape and have a width of 80 μm and a depth D6 of 120 μm. The distance between the groove 31 and the grooves 41, 51, i.e. the width of projections for forming the shutter elements, is 60 μm. The width of the shutter projections and the depths D4, D6 of the grooves 31 and 41, 51 are variable as desired in accordance with the performance required of the light shutter within the tolerance of precision cutting, provided that D4=D6 to assure uniformity of parallel electric field.

Figure 15:
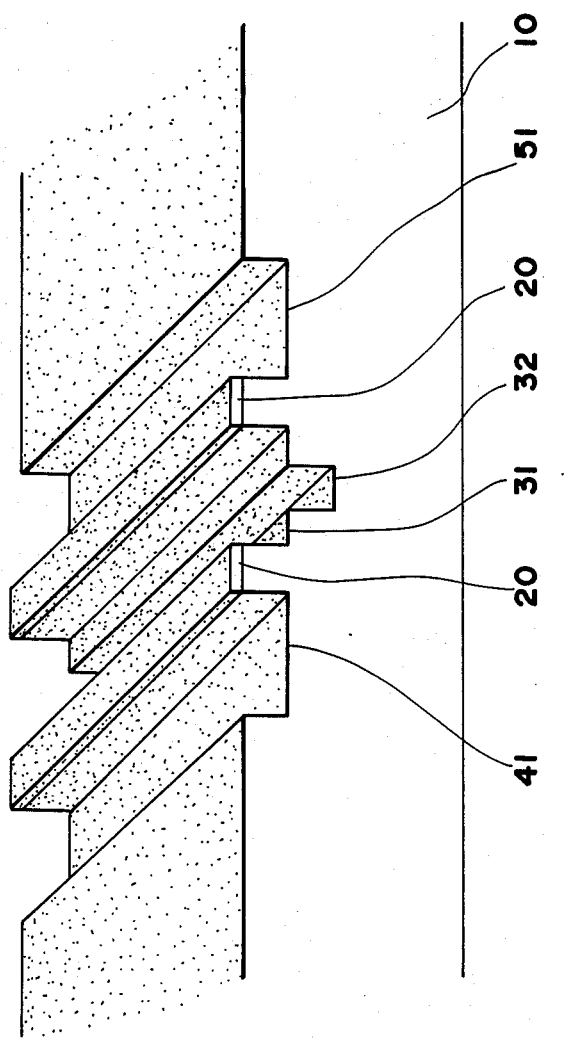

Next, a thin electrode film is provided. According to the present embodiment, aluminum was deposited over the entire surface of the plate 10 including the machined portions. The deposited aluminum film is about 2 μm in thickness (FIG. 15).

The PLZT plate 10 formed with the aluminum film is cut, using the dicing saw again, in the Y-axis direction across the grooves 31 (extending in the X-axis direction) at right angles therewith, over the entire width of the plate 10 to a predetermined depth and with a specified pitch to form the multiplicity of grooves 61 for separating the elements. The grooves 61 are 230 μm in depth D7, 80 μm in pitch and 20 μm in width. A different diamond cutter with a cutting edge thickness of 15 μm is used.

As will be apparent from the section shown in FIG. 13, the cut depth D7 of the grooves 61 satisfies the relation of (D4+D5)>D7>D6. The grooves 61 thus formed separate the shutter elements in each array, the individual electrodes and lead portions thereof from one another without removing the aluminum film formed in the bottom of the second groove 32 for the common electrode. The deposited aluminum film extends continuously without being cut almost over the entire bottom surface and side wall surfaces defining the groove 32. The aluminum film portions on the side walls are continuous with the aluminum film portions on the bottom surface and side walls defining the first groove 31. Accordingly, the aluminum film continuously extending over the grooved portions 31, 32 serves as the common electrode for the group of shutter elements 111 and the group of shutter elements 121.

In the final step of the fabrication process, the aluminum film on the top window portions of the shutter elements 111, 121 is removed. The aluminum film, which is formed over the resist 20, is removed along with the resist 20 with a resist stripping agent (lift-off method).

In this way, the light shutter unit 101 shown in FIGS. 13 and 16 is obtained. This unit 101 comprises the shutter array 111A of shutter elements 111 individually having electrode lead portions 141L extending to one outer edge of the plate, and the shutter array 121A of shutter elements 121 having electrode lead portions 151L extending to the outer edge on the other side. Thus, the unit has two arrays.

Figure 17A:
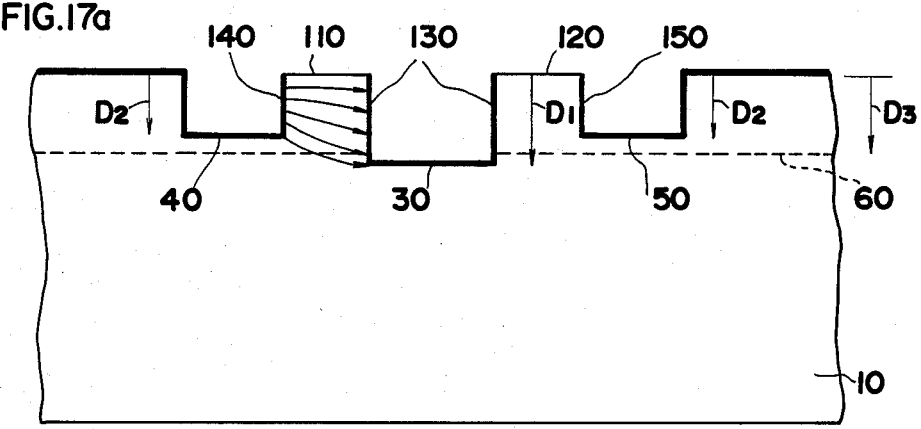
FIG. 17(a) is a view in section taken along the line B—B in FIG. 6 and showing the light shutter unit 100.
Figure 17B:
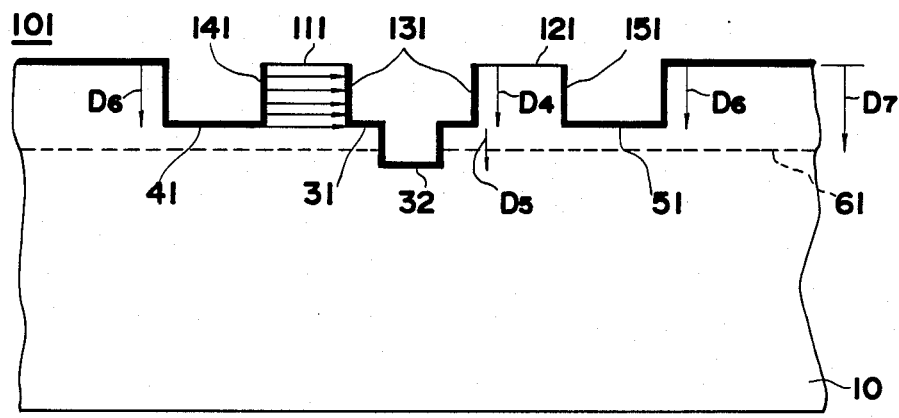
FIG. 17(b) is a view in section taken along the line C—C in FIG. 16 and showing the light shutter unit 101.

The light shutter unit 101 of the second embodiment has the advantage that an electric field can be applied to the shutter elements 111, 121 more uniformly than is the case with the first embodiment described. FIG. 17(a) shows the B—B section of the light shutter unit 100 of the first embodiment of FIG. 6. With reference to this drawing, one of the opposed electrodes for each of the shutter elements 110, 120, i.e. the common electrode, is greater than the individual electrode in vertical length to render the electric field uneven as illustrated, producing an adverse effect, such as chromatic aberration, on the light which is subjected to the shutter action. With reference to FIG. 17(b) showing the C—C section of the shutter unit 101 of FIG. 16, the depth D4 of the common electrode groove 31 is made equal to the depth D6 of the individual electrode grooves 41, 51 to give the opposed electrodes the same vertical length according to the second embodiment so as to obviate the adverse influence. On the other hand, the second groove 32 which is deeper than the groove 31 is formed so that the aluminum film serving as the common electrode remains even when the grooves 61 are formed.

Figure 17C:
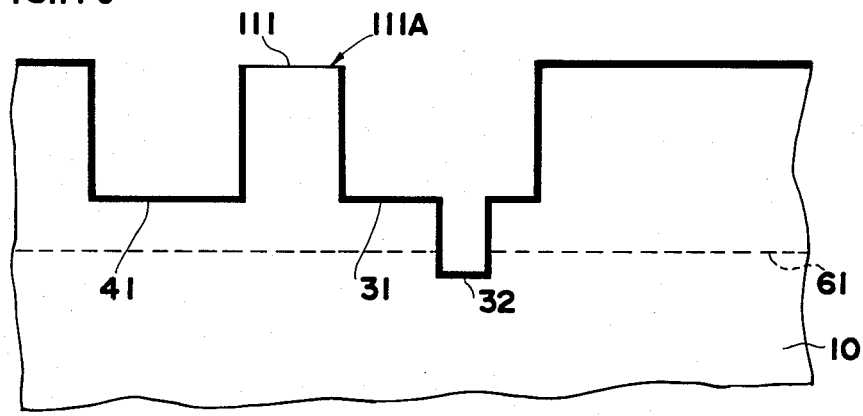
FIG. 17(c) is a fragmentary perspective view showing a modification of the light shutter unit 101 of FIG. 17(b) wherein one shutter array is provided.

Further the second embodiment may have only one shutter array 11A as seen in FIG. 17(c). This array is formed by the same process as above without the step of forming the groove 51.

Next, the third embodiment will be described. This embodiment is an improvement over the second embodiment in respect of the shutter unit and differs therefrom only in the shape of the shutter window of the shutter element.

Figure 18:
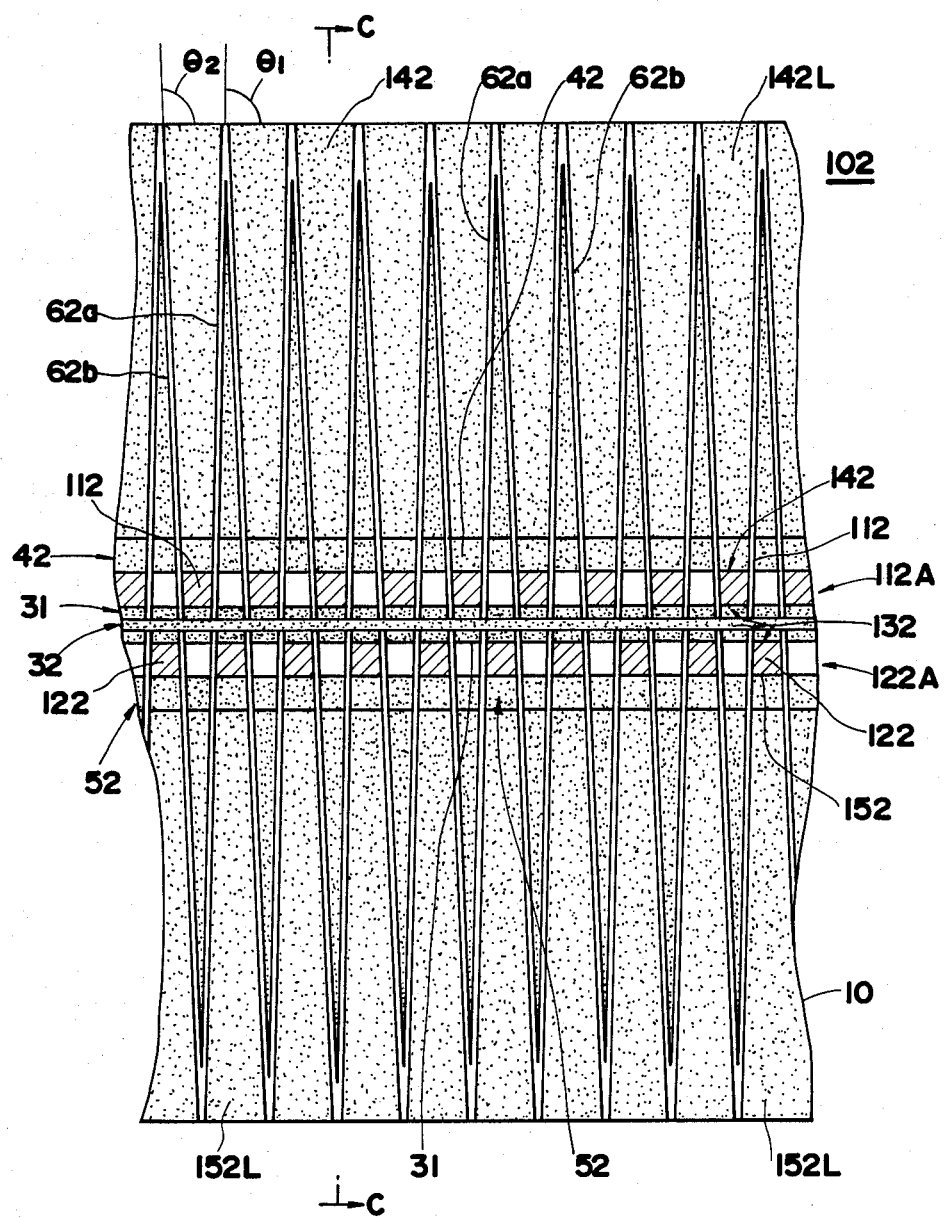
FIG. 18 is a fragmentary plan view showing a light shutter unit 102 included in a light shutter device as a third embodiment of the invention.
Figure 20A:
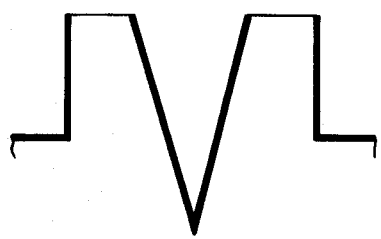
FIGS. 20(a), (b), (c), (d) and (e) are sectional views showing the shapes of grooves useful for the light shutter unit.
Figure 20B:
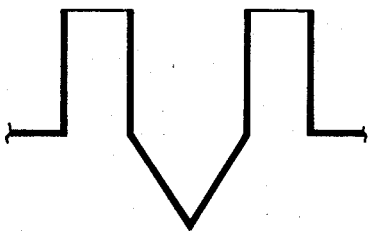
Figure 20C:
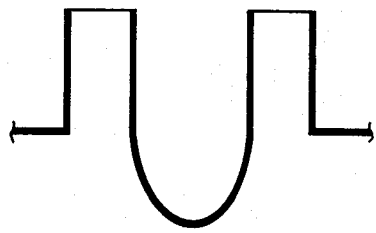
Figure 20D:
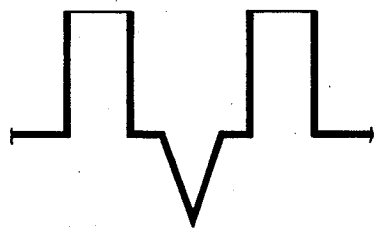
Figure 20E:
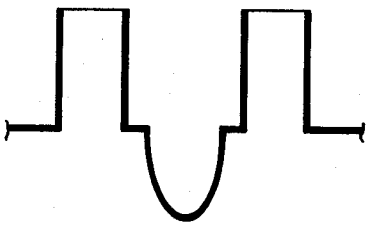

FIG. 18 is a fragmentary plan view showing the third embodiment. In FIGS. 16 and 18, like parts are designated by like or corresponding reference numerals and will not be described in detail repeatedly. With this embodiment, the shutter elements 112, 122 each have a trapezoidal window. Grooves 62 for separating the elements comprise zigzag grooves 62a, 62b having starting ends at the same position. The groove 62a has a cutting angle $\theta 1$, for example, of 89 deg with respect to the X-axis direction, and the groove 62b a cutting angle $\theta 2$ of 91 deg. The grooves 62a or 62b extend over the entire width of the PLZT plate 10, have a specified pitch (e.g. 160 μm) and are formed by a diamond cutter having a cutting edge thickness of 15 μm. The unit has the same C—C section as shown in FIG. 17(c).

Since the shutter elements have a trapezoidal window form, the third embodiment is more advantageous than the foregoing two embodiments in respect of connection to the external circuits and of the formation of images. Each of the electrode lead portions 142L, 152L of the shutter elements 142, 152 (shown as hatched) to be operated is in the form of a tapezoid having an increased length at its bottom which is positioned at the edge of the plate 10. The length of the bottom is 140 μm, and the center-to-center pitch of the lead portions is 160 μm. This assures connection with lead with ease and with sufficient strength.

For the operation of the shutter, the shutter arrays 112A, 122A are driven on time division base in the same manner as in FIG. 10(a), as seen in FIG. 19(a). FIG. 19 (b) shows a dot-like line consequently formed. The dot-like line represented in solid line shows a momentary projected image thereof at a moment when the shutter arrays 112A, 122A are operated. In actuality, the photosensitive member is in rotation when an image is projected through the shutter, so that the projected image of the shutter elements 112, 122 forms a locus on the photosensitive member. Consequently, the dots formed are rectangular dots 112d, 122d indicated in broken lines and corresponding to the locus of the bottom of a trapezoid. These adjacent dots 112d, 122d overlap each other, eliminating a dot-to-dot gap 62g due to a physical gap formed between the shutter elements by the element separating grooves 62a, 62b. Accordingly, the trapezoidal form of the shutter element windows serves to form a line of closely arranged dots, giving an improved quality to the image to be produced. Further when a gap is formed between the elements by cutting as seen in FIG. 19(b), the gap is relatively large partly because of the thickness of the cutting edge of the cutter. The trapezoidal window form serves to reduce the influence resulting from the presence of the gap.

The shutter unit 102 of the third embodiment has the same construction as the shutter unit 101 of the second embodiment except that the shutter window of the former is trapezoidal. The same effect is of course available when the shutter window of the unit 100 of the first embodiment is made trapezoidal.

In the foregoing embodiments, the lead portion of the individual electrode is used merely for connection to a lead wire and need not be projected above the bottom of the element separating groove but can be positioned in the same plane as the bottom surface of the groove.

The light shutter unit is not limited to the dimensions mentioned with reference to the foregoing embodiments. The unit can be constructed by machining within the permissible range of accuracy of the cutter. For example, although the grooves for the individual electrodes, common electrode and for the separation of the elements are rectangular in the foregoing embodiments, these grooves may be V-shaped or U-shaped as seen in FIGS. 20(a) to (e). When an electrode is formed in the V-shaped groove shown in FIG. 20(a), the shutter elements are subjected to an uneven electric field and are therefore influenced by the occurrence of chromatic aberration or the like as already stated. In the case of the grooves of the shapes shown in FIGS. 20(b), (c), (d) and (e), the electric field set-up portion where the electrode is provided has wall surfaces which are perpendicular to the plane where the shutter window is formed, while the portion deeper than the field set-up portion is V-shaped or U-shaped with or without a step. Accordingly, the electrode in the deeper portion is positioned progressively away from the opposed electrode. This diminishes the above influence.

Further even when two arrays of shutter elements are provided, all the shutter elements or every two elements may be made operable provided that the electrode lead portions are connectable to the external circuits.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An electro-optical light shutter device for use in electrophotographic printers or the like, comprising:
    an elongated plate having an electro-optical effect, the plate having a first groove extending longitudinally thereof, a second groove positioned parallel to the first groove by a predetermined distance, the second groove having a smaller depth than the first groove, and a plurality of third grooves extending in a direction across the first and second grooves and having a smaller depth than the first groove but a larger depth than the second groove, the plate being provided with a plurality of projections divided by the first, second and third grooves and aligned longitudinally of the plate;
    a common electrode provided on the wall of said first groove for each of the plurality of projections in common;
    individual electrodes provided on the wall portions of said second groove corresponding to the respective projections individually;
    a drive circuit connecting to said common electrode and to said individual electrodes for selectively applying an electric field to the projections;
    a polarizer disposed on the light incident side of said plate; and
    an analyzer disposed on the light emergent side of said plate.

2. An electro-optical light shutter device as claimed in claim 1, wherein said plate consists of PLZT.

3. An electro-optical light shutter device as claimed in claim 1, wherein said plate has one first groove and two second grooves on both sides of the first groove, extending longitudinally of the plate, each of the second grooves having a smaller depth than the first groove, such that said plate is provided with projections arranged in two lines longitudinally of the plate.

4. An electro-optical light shutter device as claimed in claim 3, wherein said individual electrodes provided for each of the projections are provided in two lines and are alternately connected to said drive circuit, thereby the projections to be subject to an electric field are positioned in zigzag.

5. An electro-optical light shutter device as claimed in claim 1, wherein one of said grooves has an intermediate step extending longitudinally of said plate at the same depth as said second groove.

6. An electro-optical light shutter device as claimed in claim 1, wherein one of said first, second or third grooves is a V-shaped groove.

7. An electro-optical light shutter device as claimed in claim 1, wherein one of said first or second grooves is a U-shaped groove.

8. An electro-optical light shutter device for use in electrophotographic printers or the like, comprising:
    an elongated plate having an electro-optical effect, the plate having a first groove extending longitudinally thereof, a second groove parallel to the first groove separated from said first groove by a predetermined distance and a plurality of third grooves extending in a direction across the first and second grooves, each of the first groove, second groove and third set of groves having a different depth from each other, the plate being provided with a plurality of projections divided by the first, second and third grooves and aligned longitudinally of the plate;
    a common electrode provided on the wall of said first groove for each of the plurality of projections in common;
    individual electrodes provided on the wall portions of said second groove corresponding to the respective projections individually;
    a drive circuit connecting to said common electrode and to said individual electrodes for selectively applying an electric field to the projections;
    a polarizer disposed on the light incident side of said plate; and
    an analyzer disposed on the light emergent side of said plate.

9. An electro-optical light shutter device as claimed in claim 8, wherein said first, second and third grooves are formed.

10. An electro-optical light shutter device as claimed in claim 8, wherein said second groove has a smaller depth than said first groove and said third grooves have a smaller depth than the first groove but a larger depth than the second groove.

11. An electro-optical light shutter device as claimed in claim 8, wherein said individual electrodes are divided by the third grooves so as to correspond to the respective projections individually.

12. A method for composing an electro-optical light shutter device for use in electro-photographic printers or the like, comprising the steps of:
forming a first groove and a second groove extending longitudinally of an elongated plate having an electro-optical effect, the second groove having a smaller depth than said first groove parallel to the first groove separated from the first groove by a predetermined distance;
providing an electrode material on the entire surface of said plate;
providing a plurality of projections which are taken off the electrode material thereon and aligned longitudinally of the plate by forming a plurality of third grooves having a smaller depth than the first groove but a larger depth than the second groove in a direction across the first and second grooves;
connecting a drive circuit which applies an electric field to the projections selectively to the electrode provided on the wall of said first groove for the plurality of projections in common and to the electrodes provided on the wall portions of said second groove corresponding to the respective projections individually; and
disposing a polarizer and an analyzer on the light incident side and the light emergent side of said plate, respectively.

13. A method as claimed in claim 12, wherein said plate consists of PLZT.

14. A method as claimed in claim 12, wherein said first, second and third grooves are formed by cutting.

15. A method as claimed in claim 12, wherein said electrodes provided on the wall portions of said second groove are divided by the forming of said third grooves so as to correspond to the respective projections individually.

16. A method as claimed in claim 12, wherein two of the second grooves are formed on both sides of the first groove extending longitudinally of the plate, each of the second grooves having a smaller depth than the first groove, thereby, said plate is provided with projections arranged in two lines longitudinally of the plate.

17. A method as claimed in claim 16, wherein said electrodes provided on the wall portions of said second groove are alternately connected to said drive circuit, thereby the projections subject to an electric field are positioned in zigzag.

18. An electro-optical light shutter device as claimed in claim 12, wherein said first groove has an intermediate step extending longitudinally of said plate at the same depth as said second groove.

* * * * *